United States Patent
Mir et al.

(10) Patent No.: US 6,441,578 B1
(45) Date of Patent: Aug. 27, 2002

(54) METHOD AND APPARATUS FOR TORQUE LINEARIZATION IN AN ELECTRIC POWER STEERING SYSTEM

(75) Inventors: Sayeed A. Mir, Saginaw; Dennis B. Skellenger, Vassar, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/652,237

(22) Filed: Aug. 31, 2000

Related U.S. Application Data (60) Provisional application No. 60/154,052, filed on Sep. 16, 1999.

(51) Int. Cl.[7] .................................................. G05B 11/28
(52) U.S. Cl. ........................ 318/599; 318/432; 318/434; 318/632
(58) Field of Search ................................ 318/599, 432, 318/434, 632

(56) References Cited

U.S. PATENT DOCUMENTS

| | | | |
|---|---|---|---|
| 3,919,609 A | 11/1975 | Klautschek et al. | 318/227 |
| 4,027,213 A | 5/1977 | de Valroger | 318/138 |
| 4,217,508 A | 8/1980 | Uzuka | 310/46 |
| 4,240,020 A | 12/1980 | Okuyama et al. | 318/721 |
| 4,300,081 A | 11/1981 | Van Landingham | 318/599 |
| 4,392,094 A | 7/1983 | Kuhnlein | 318/254 |
| 4,447,771 A | 5/1984 | Whited | 18/661 |
| 4,458,192 A | 7/1984 | Sakamoto et al. | 318/798 |
| 4,511,827 A | 4/1985 | Morinaga et al. | 318/254 |
| 4,556,811 A | 12/1985 | Hendricks | 310/266 |
| 4,628,499 A | 12/1986 | Hammett | 364/167 |
| 4,661,756 A * | 4/1987 | Murphy et al. | 318/701 |
| 4,691,269 A | 9/1987 | Yamane et al. | 363/41 |
| 4,825,132 A | 4/1989 | Gritter | 318/811 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 5,063,011 A | 11/1991 | Rutz et al. | 264/126 |
| 5,069,972 A | 12/1991 | Versic | 428/407 |
| 5,122,719 A | 6/1992 | Bessenyei et al. | 318/629 |
| 5,155,419 A | 10/1992 | Naito | 318/254 |
| 5,223,775 A | 6/1993 | Mongeau | 318/432 |

(List continued on next page.)

Primary Examiner—Robert E. Nappi
Assistant Examiner—Rita Leykin
(74) Attorney, Agent, or Firm—Edmund P. Anderson (57) ABSTRACT

An exemplary embodiment of the invention is a method of controlling a motor in an electric power steering system. The method includes obtaining a motor control signal having an initial duty cycle and linearizing the initial duty cycle to obtain a secondary duty cycle. An offset is added to the secondary duty cycle to obtain an adjusted duty cycle. The motor is controlled using the adjusted duty cycle. An alternative embodiment is a torque linearization device for linearizing torque produced by a motor in response to a motor control signal having an initial duty cycle. The torque linearization device includes a comparator for receiving the initial duty cycle and comparing the initial duty cycle to a threshold. A linearization table converts the initial duty cycle to a linearized duty cycle. A selector receives the initial duty cycle and the linearized duty cycle and selects one of the initial duty cycle and the linearized duty cycle as a secondary duty cycle in response to the comparing.

14 Claims, 7 Drawing Sheets

U.S. PATENT DOCUMENTS

| | | | |
|---|---|---|---|
| 5,257,828 A | 11/1993 | Miller et al. | 180/79.1 |
| 5,319,294 A | 6/1994 | Ohto et al. | 318/568.22 |
| 5,444,341 A | 8/1995 | Kneifel, II et al. | 318/432 |
| 5,451,900 A | 9/1995 | Haga et al. | 330/10 |
| 5,469,215 A | 11/1995 | Nashiki | 318/432 |
| 5,579,188 A | 11/1996 | Dunfield et al. | 360/99.08 |
| 5,616,999 A | 4/1997 | Matsumura et al. | 318/632 |
| 5,625,542 A | 4/1997 | Stemmler et al. | 363/41 |
| 5,645,496 A | 7/1997 | Woodland et al. | 318/632 |
| 5,672,944 A | 9/1997 | Gokhale et al. | 318/254 |
| 5,760,562 A | 6/1998 | Woodland et al. | 318/632 |
| 5,777,449 A | 7/1998 | Schlager | 318/459 |
| 5,780,986 A * | 7/1998 | Shelton et al. | 318/432 |
| 5,852,355 A | 12/1998 | Turner | 318/701 |
| 5,867,380 A | 2/1999 | Lee | 363/98 |
| 5,898,990 A | 5/1999 | Henry | 29/598 |
| 5,920,161 A | 7/1999 | Obara et al. | 318/139 |
| 5,963,706 A | 10/1999 | Baik | 388/804 |
| 5,977,740 A | 11/1999 | McCann | 318/701 |
| 5,998,945 A | 12/1999 | Elliott | 318/254 |
| 6,002,226 A * | 12/1999 | Collier-Hallman et al. | 318/439 |
| 6,008,599 A | 12/1999 | Beck | 318/254 |
| 6,046,560 A | 4/2000 | Lu et al. | 318/432 |
| 6,049,473 A | 4/2000 | Jang et al. | 363/89 |
| 6,051,942 A * | 4/2000 | French | 318/254 |
| 6,107,767 A | 8/2000 | Lu et al. | 318/561 |
| 6,124,688 A * | 9/2000 | Coles et al. | 318/254 |

* cited by examiner

METHOD AND APPARATUS FOR TORQUE LINEARIZATION IN AN ELECTRIC POWER STEERING SYSTEM

CROSS-REFERENCE TO RELATED APPLICATIONS

This application claims the benefit of U.S. provisional patent application serial number 60/154,052 filed Sep. 16, 1999, the entire contents of which are incorporated herein by reference.

TECHNICAL FIELD

This invention relates to electric power steering systems.

BACKGROUND OF THE INVENTION

Electric power steering (EPS) systems have been the subject of development by auto manufacturers and suppliers for over a decade because of fuel economy and ease-of-control advantages compared with the traditional hydraulic power steering (HPS). Commercialization of EPS systems, however, has been slow and is presently limited to small and midget-class cars due to cost and performance challenges. Among the most challenging technical issues is the pulsating feel at the hand wheel (also referred to as torque ripple) and the audible noise associated with the type of high performance electric drives needed to meet the steering requirements.

Existing EPS systems employ various methods of controlling a sinusoidal brushless motor to assist steering. The power to the sine motor is provided by a by a electric power converter. The power converter converts the input voltage from a constant voltage source to desired voltage by controlling the width (also known as duty cycle) of the voltage pulses during a constant switching period. Also the sinusoidal shape of the line voltage and therefore the current is achieved by pulse width modulating the input voltage with respect to the motor position. Two existing control methods are the 50 percent duty modulation (or dual edge modulation) method and the phase grounding method. In 50% modulation technique all three phases are pulse width modulated resulting into a positive and negative voltage is being applied across the phase during a switching period so the at the average voltage across the phase is equal the desired voltage at the operating point. In phase to grounding method technique each phase of the motor is completely grounded for 120 electrical degrees and the other two phases are pulse width modulated resulting into a unipolar voltage across the phases the average of which is equal to the desired voltage across the phase at that operating point. Each method has advantages and disadvantages, but the 50 percent duty modulation method has been preferred due to its superior torque ripple "on-center" (i.e., when the vehicle hand wheel is close to its center position). In phase to grounding technique at very small torque levels which happens when the steering wheel is near the center the desired width of the voltage pulses is very small. This also appears near the zero crossing of the sine wave. Due to the dead time (where both switched in a phase leg are off) between the switches and the nonlinearities and propagation delays in the switching devices, no voltage appears across the phase until the desired voltage and therefore the duty cycle reaches a thrush hold and then the voltage starts to increase in a nonlinear fashion. This nonlinear change in the voltage creates an undesired on-center feel in the electric power steering systems. Thus, there is a need for improving the on-center torque ripple in phase grounding controlled EPS systems.

SUMMARY OF THE INVENTION

An exemplary embodiment of the invention is a method of controlling a motor in an electric power steering system. The method includes modifying the desired duty cycle to compensate for the nonlinearities caused by the switching devices that appear in the voltage and therefore in the current and torque of the motor. This is achieved by obtaining a motor control signal having an initial duty cycle and linearizing the initial duty cycle to obtain a secondary duty cycle. An offset is added to the secondary duty cycle to obtain an adjusted duty cycle. The motor is controlled using the adjusted duty cycle.

An alternative embodiment is a torque linearization device for linearizing torque produced by a motor in response to a motor control signal having an initial duty cycle.

The torque linearization device includes a comparator for receiving the initial duty cycle and comparing the initial duty cycle to a threshold (below which the linearization is needed). If the duty cycle is below the threshold a table converts a linearization table converts the initial duty cycle to a linearized duty cycle. A selector receives the initial duty cycle and the linearized duty cycle and selects one of the initial duty cycle or the linearized duty cycle as a secondary duty cycle. An offset is then added to the secondary duty cycle.

DESCRIPTION OF THE PREFERRED EMBODIMENT

The invention may be used in EPS systems using phase grounding pulse width modulation technique to control of a motor. There are various methods of utilizing a sinusoidal brushless motor to assist steering. In one method, the power to this sine motor is provided by a controller, which includes of a vehicle interface stage, a microprocessor, motor control logic and a power inverter stage. Control of the motor is achieved by providing a pulse width modulated signal having a duty cycle to a power inverter (also referred to as a gate drive) which utilizes a number of switching devices (e.g., field effect transistors or FET's) to provide current to the phase windings in the motor. An increase in duty cycle increases the current delivered to the motor and thus increases the steering assistance provide by the motor.

Figure 1:
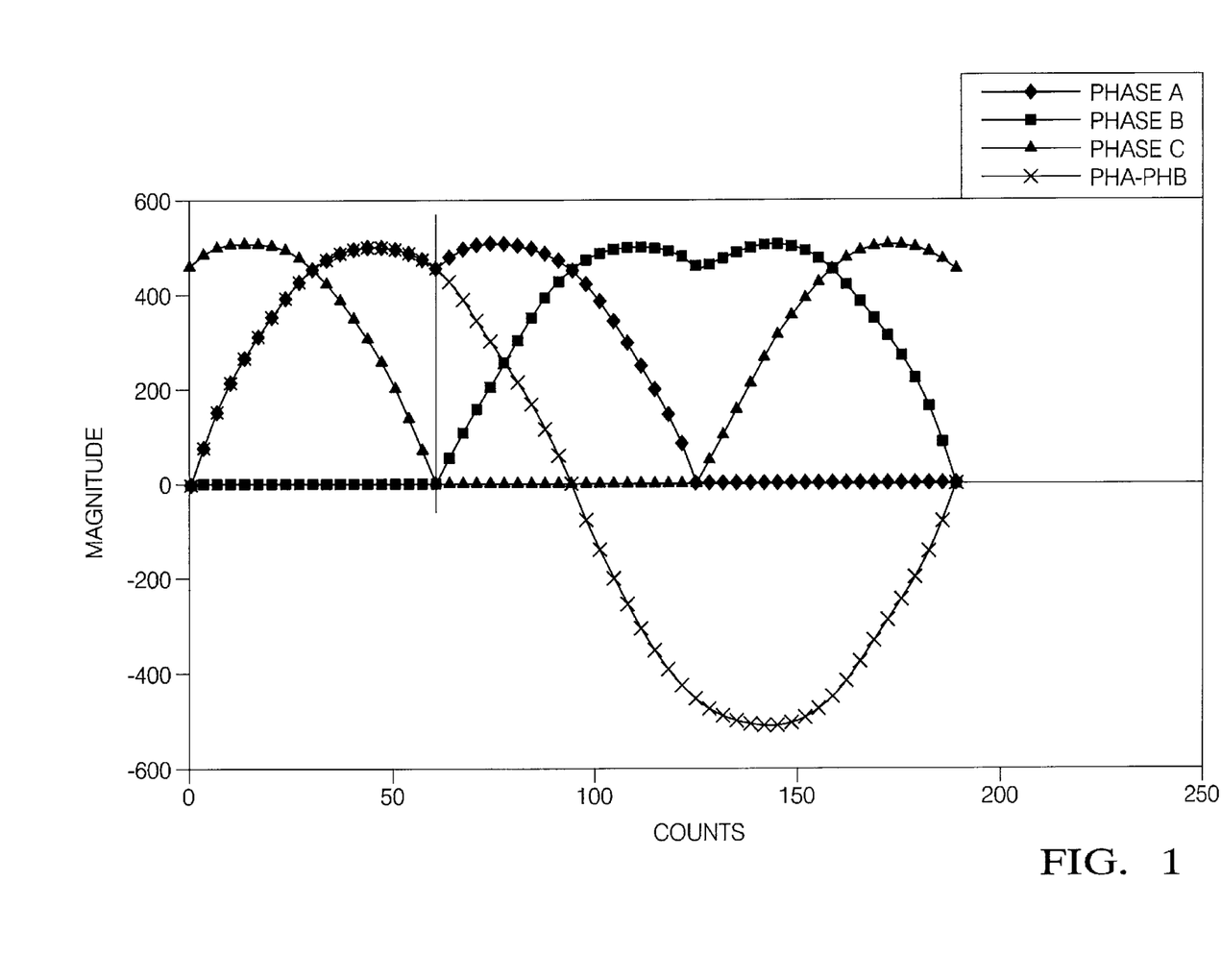
FIG. 1 is a graph of phase voltage versus motor position.

As described above, the phase grounding control method generates non-linear torque near the on-center condition where the duty cycle is low. To demonstrate the non-linearity of the phase grounding method, a point on the sinusoidal look up table (LUT) is chosen. The sinusoidal LUT's are used to determine the voltage applied to each phase of the motor. FIG. 1 displays the sine LUT's plotted as magnitude vs. motor position. For linearization of the relationship of duty cycle command vs. phase current, a point on the LUT is selected where the phase An upper gate drive is the only upper gate that will be enhanced. The other two upper FET's for phases B and C will not be pulse width modulating at this point due to the voltage magnitude being zero. This point is shown at motor position 64 in FIG. 1. Selecting this point isolates phase A for torque linearization analysis.

Figure 2:
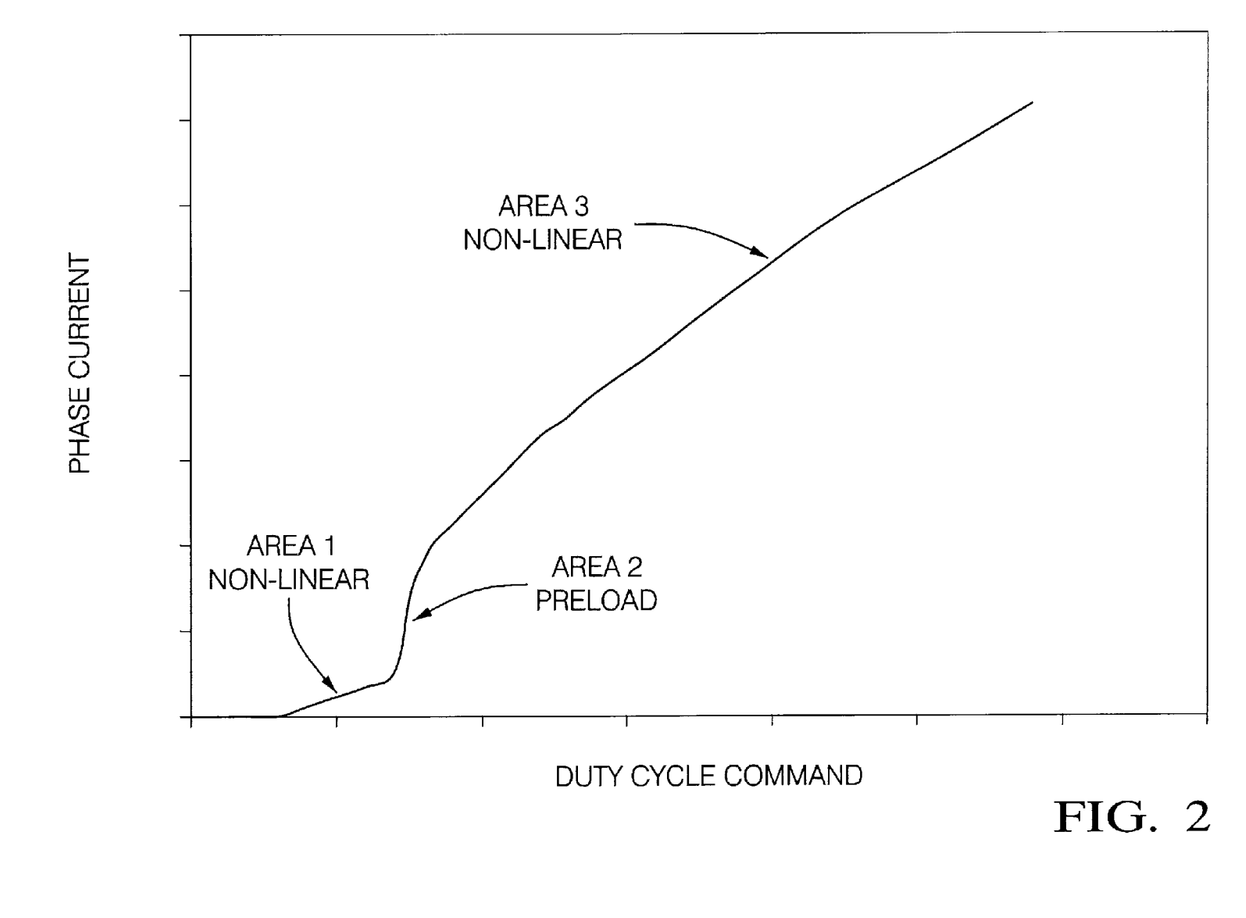
FIG. 2 is a graph of phase current versus duty cycle count without linearization.

With the motor position value locked at 64 counts, a typical plot of duty cycle command vs. phase current is depicted in FIG. 2. In FIG. 2, there are basically two different non-linear portions of the curve along with a jump in current that is commonly referred to as preload. There is also a "dead band" area at the first few duty cycle counts that results because there is not enough voltage at the gate drive to enhance the FET.

Figure 3:
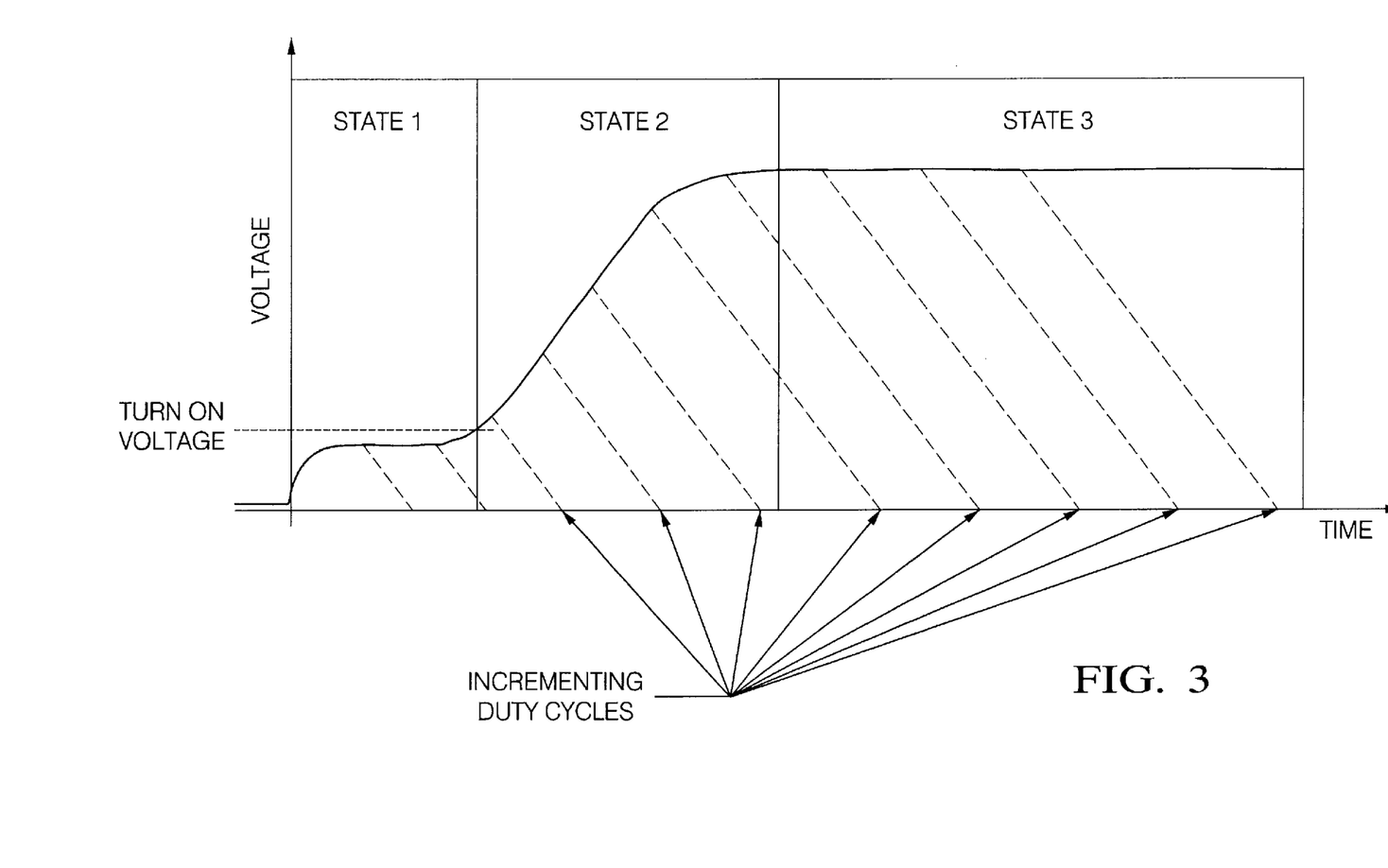
FIG. 3 is a graph of FET gate voltage versus time depicting increasing duty cycles.

To explain the three different shapes of the curve in FIG. 2 it is necessary to understand the gate drive charge of the FET during enhancement. FIG. 3 approximates gate drive voltages for the gate An upper FET during turn on for several incremental duty cycle commands.

Referring to FIG. 3, state 1 is the "dead band state" because the FET gate drive voltage is not high enough to drive the FET into its linear region. This results in the phase current "dead band" in FIG. 2 at the first few duty cycles. State 2 in FIG. 3 represents the FET gate drive voltage in the linear region when the FET is not fully enhanced. Incremental duty cycles ending in this region result in drain current that increase in a non-linear fashion. When duty cycles end in this region the non-linearity shown in Area 1 of FIG. 2 is evident. During the end of State 2 the FET becomes fully enhanced which causes a rise in current that is shown as the preload in Area 2 of FIG. 2. Duty cycles that end after the FET has been fully enhanced now increase in a linear fashion. However, because the nonlinear portion of State 2 in FIG. 3 still exists, it creates nonlinearities shown in Area 3 of FIG. 2. As the duty cycles increase through State 3 the effect of State 2 becomes less and less and the duty cycle command vs. phase current plot approaches linearity.

The torque ripple occurs when a small amount of torque is applied to the hand wheel "on-center" or in the neighborhood of a center position of the hand wheel, but receives little or no assist from the motor because the FET's in the gate drive are operating in Area 1 of FIG. 2. As the driver increases torque to the hand wheel the FET's become fully enhanced and the preload effect of Area 2 in FIG. 2 results in an overshoot (or amplification) of torque assist. This scenario creates one or multiple torque ripple bumps when the hand wheel is at or near the on-center position. The non-linearity of Area 3 also results in improper torque assistance but is not as prevalent and may be reduced through software calibration.

One embodiment of the invention solves this on-center torque ripple problem by altering the duty cycle of the motor control signal based on the phase current needed to maintain a smooth feel to the driver. By measuring the phase current at various duty cycles, a table can be developed to linearize FIG. 2. This table is dependent on factors in the power stage and the motor itself and may of course be altered as motor and power stage parameters change. Generation of the linearization table and its implementation are described herein.

Figure 4:
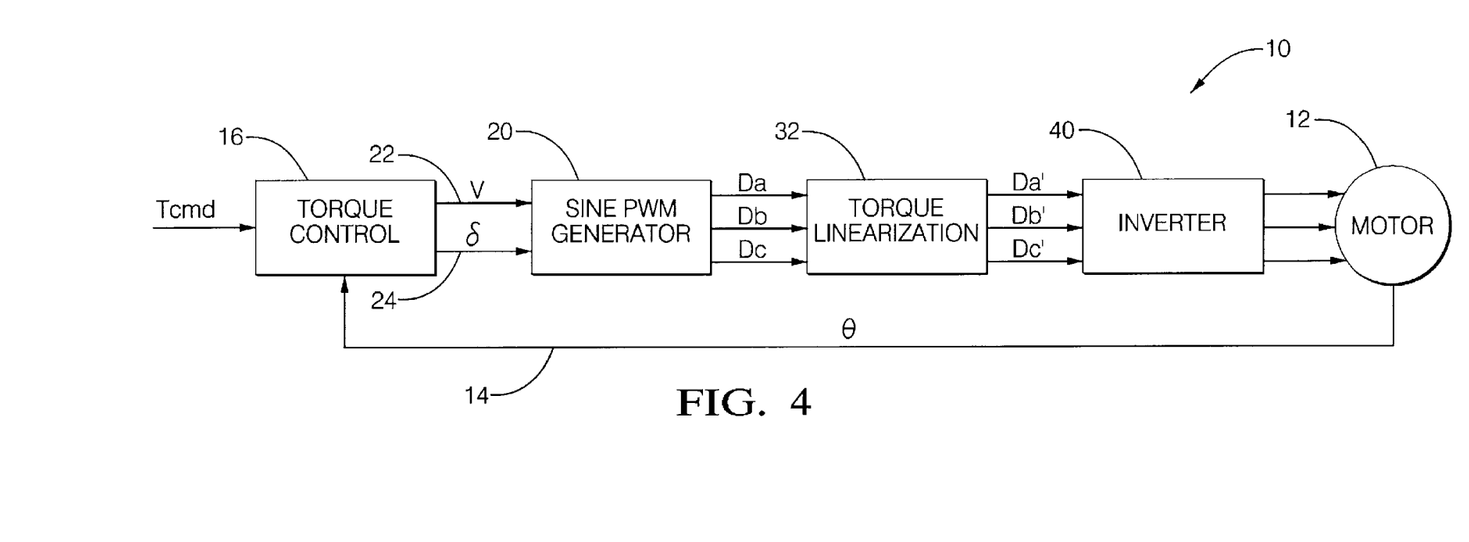
FIG. 4 is a schematic diagram of an exemplary EPS motor drive.

Referring to FIG. 4, reference numeral 10 generally designates an EPS system suitable for implementation of the invention. A brushless motor 12 provides a position signal θ via line 14 into a torque control device 16. The torque control device 16, a sine PWM generator 20 and voltage-torque linearization device 32 may be implemented using a controller (e.g., a microprocessor) executing a stored computer program. The position signal θ along with a torque command signal Tcmd provide the inputs of the torque control device 16. The outputs of the torque control device 16, a V signal and a δ signal are provided to a sine pulse width modulation (PWM) generator 20. The outputs of the sine pulse width modulation (PWM) generator 20 is a control signal having duty cycle Da, Db and Dc which correspond to the duty cycles for each phase of the motor. The initial duty cycles, Da, Db and Dc are inputted to a torque linearization device 32. This torque linearization device 32 is described in detail with reference to FIG. 5. The torque linearization device 32 generates adjusted duty cycles, Da', Db' and Dc' which are applied to an inverter 40. The inverter 40 may include a set of power switches such as FET's. The outputs of the inverter 40 are applied to the stator of the brushless motor 12.

Figure 5:
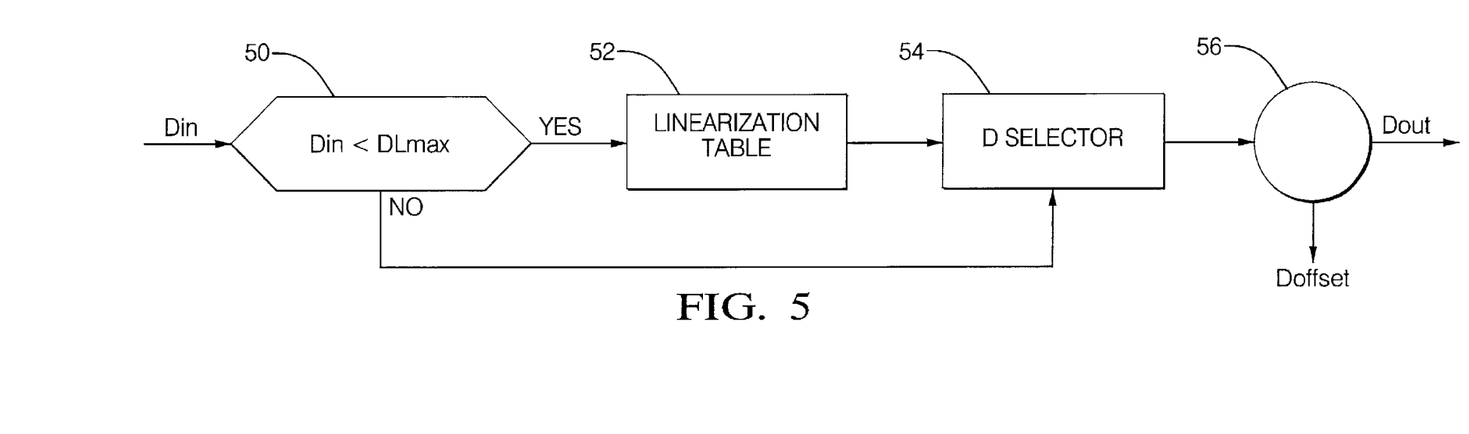
FIG. 5 is block diagram of an exemplary torque linearization device.

FIG. 5 is a block diagram of the torque linearization device 32 of FIG. 4. The processing performed by the torque linearization device 32 is described with reference to a singe phase and it is understood that similar processing may be performed for all phases of a multi-phase motor. The input duty cycle $D_{in}$ is compared to a threshold $DL_{max}$ at comparator 50. As described above, linearization is needed primarily for low duty cycle counts and thus, if the initial duty cycle is greater than the threshold, linearization is not needed. The result of the comparator is provided to a duty cycle selector 54 described herein. The initial duty cycle $D_{in}$ is provided to a linearization table 52 which linearizes the initial duty cycle values. The linearization table 52 is described herein with reference to FIGS. 6–8. The initial duty cycle and the linearized duty cycle are provided to duty cycle selector 54 which selects the initial duty cycle if the initial duty cycle exceeds the threshold $DL_{max}$ and selects the linearized duty cycle otherwise. The output of the selector 54 is referred to as the secondary duty cycle. The output of selector 54 is provided to summer 56 where a duty cycle offset $D_{offset}$ is added to generate an adjusted duty cycle $D_{out}$.

Figure 6:
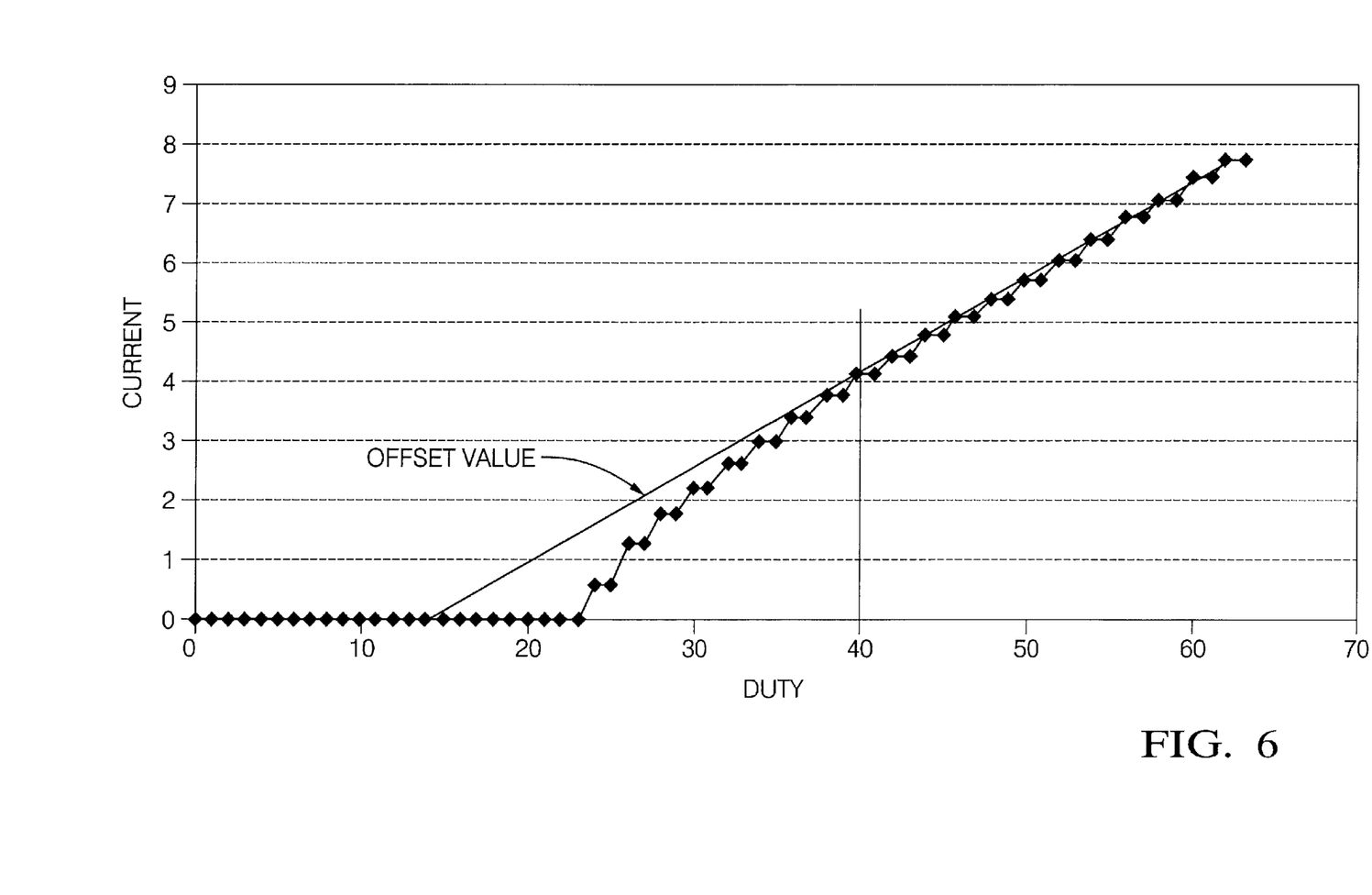
FIG. 6 is a graph of current versus duty cycle without linearization.

Generation of the linearization table 52 will now be described. FIG. 6 is plot of phase current vs. duty cycle count for one phase of the motor 12 and shows the non-linearity particularly for low duty cycles. In implementing the invention, it may be necessary to set the motor in a predetermined motor position as shown in FIG. 1 and empirically derive the plot shown in FIG. 6. Once the data is obtained, a line 80 is fit to the linear portion of the plot. The point at which line 80 intersects the X axis, meaning zero current, is the offset term $D_{offset}$ shown in FIG. 5. In FIG. 6, the offset is 15 duty cycle counts. The offset $D_{offset}$ is used so that the linearized curve passes through zero duty cycle counts. The vertical line shows the point (approximately 40 counts) at which the original curve starts to become linear. At this point the linearization table should be one-to-one meaning the linearized duty cycle count equals the initial duty cycle count. The threshold $DL_{max}$ may be set at a somewhat higher duty cycle count (e.g. 60 counts).

By using FIG. 6, a linearization table relating initial duty cycle count (duty input) to linearized duty cycle count (duty output) is created. Table 1 displays the linearization table that will be used in the for linearization table 52 for the example shown in FIG. 6.

TABLE 1

| Duty Input | Duty Output |
|---|---|
| 0 | 0 |
| 1 | 0 |
| 2 | 0 |
| 3 | 9 |
| 4 | 9 |
| 5 | 10 |
| 6 | 10 |
| 7 | 11 |
| 8 | 11 |
| 9 | 12 |
| 10 | 12 |
| 11 | 13 |
| 12 | 14 |
| 13 | 15 |
| 14 | 16 |
| 15 | 16 |
| 16 | 17 |
| 17 | 18 |
| 18 | 19 |
| 19 | 20 |
| 20 | 21 |
| 21 | 22 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |
| 31 | 31 |
| 32 | 32 |
| 33 | 33 |
| 34 | 34 |
| 35 | 35 |
| 36 | 36 |
| 37 | 37 |
| 38 | 38 |
| 39 | 39 |
| 40 | 40 |
| 41 | 41 |
| 42 | 42 |
| 43 | 43 |
| 44 | 44 |
| 45 | 45 |
| 46 | 46 |
| 47 | 47 |
| 48 | 48 |
| 49 | 49 |
| 50 | 50 |
| 51 | 51 |
| 52 | 52 |
| 53 | 53 |
| 54 | 54 |
| 55 | 55 |
| 56 | 56 |
| 57 | 57 |
| 58 | 58 |
| 59 | 59 |
| 60 | 60 |
| 61 | 61 |
| 62 | 62 |
| 63 | 63 |

Figure 7:
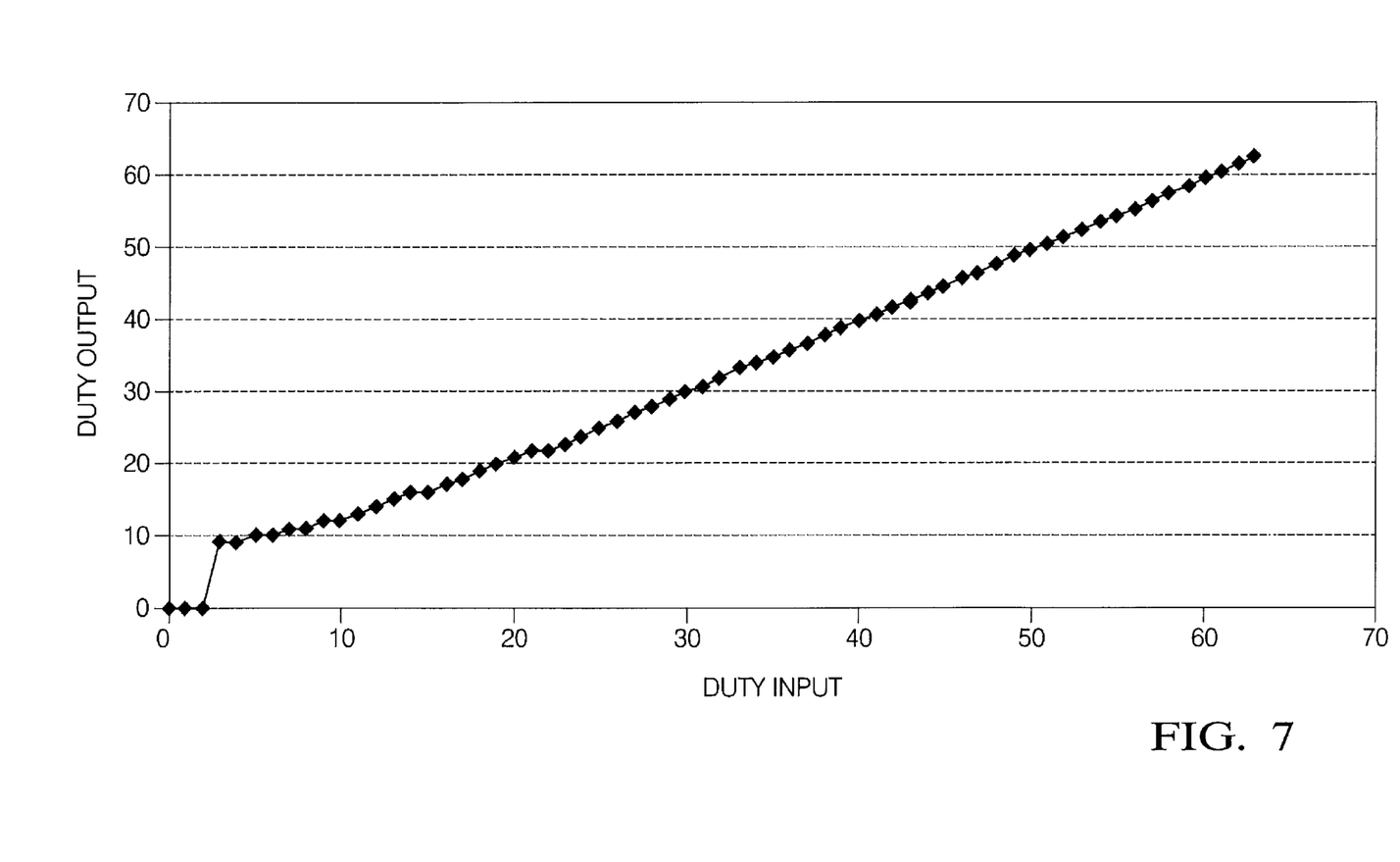
FIG. 7 graphically depicts an exemplary linearization table.
Figure 8:
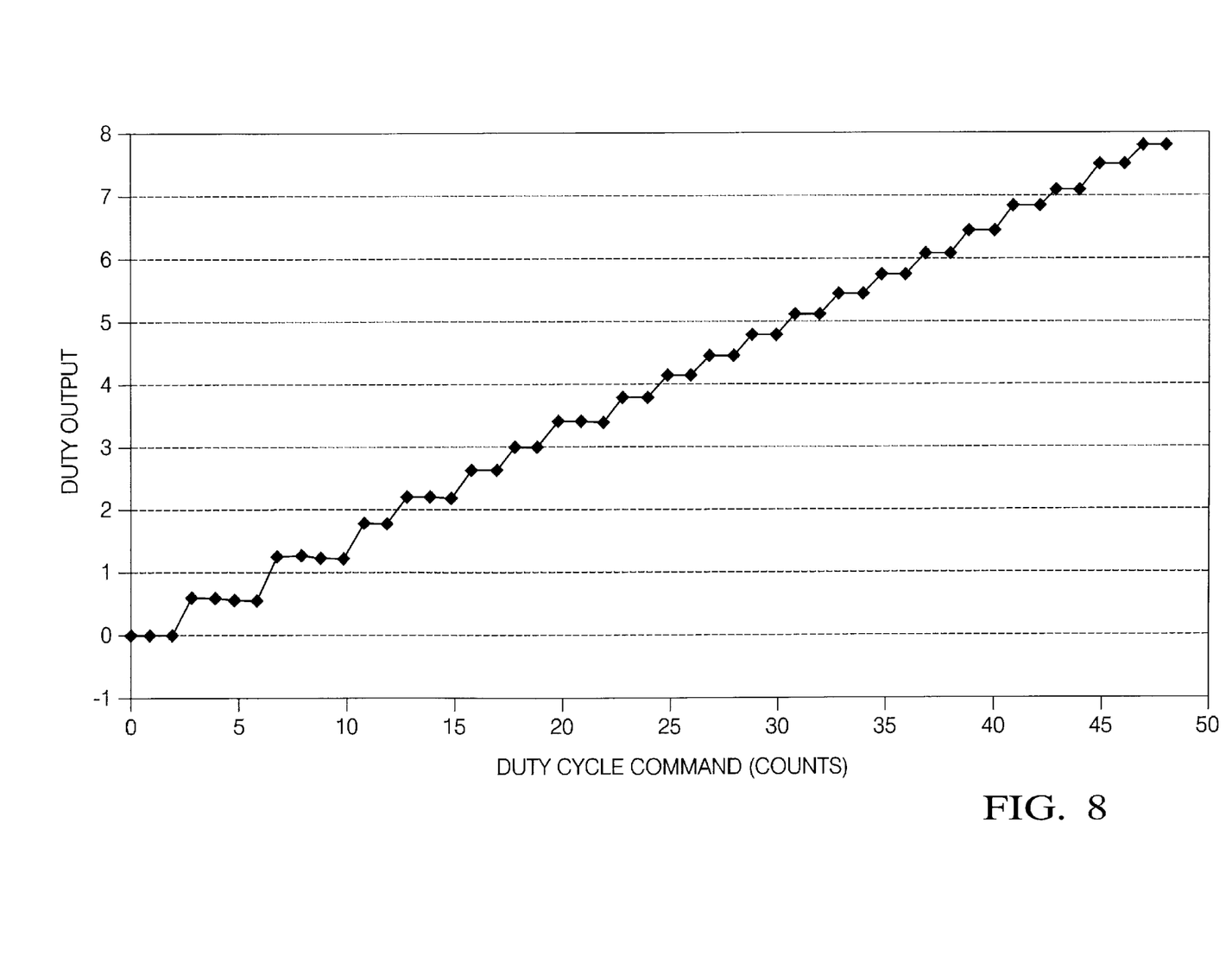
FIG. 8 depicts the relationship between duty cycle command count and current after linearization.

FIG. 7 is a graphical depiction of the linearization table represented in Table 1. FIG. 8 is a graph of current versus duty cycle count upon applying the linearization table 52 and adding the duty cycle offset $D_{offset}$. As shown in FIG. 8, the current follows duty cycle count in a linear fashion.

The present invention provides a method and apparatus for linearizing torque in an EPS system. The linearization table that will be used in the phase grounding method of sinusoidal control results in the reduction of on-center feel problems (torque ripple) in the electric power steering system.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of controlling a motor in an electric power steering system, the method comprising:
    obtaining a motor control signal having an initial duty cycle;
    linearizing said initial duty cycle to obtain a secondary duty cycle;
    adding an offset to said secondary duty cycle to obtain an adjusted duty cycle; and
    controlling said motor using said adjusted duty cycle.

2. A method of controlling a motor in an electric power steering system, comprising:
    obtaining a motor control signal having an initial duty cycle;
    linearizing said duty cycle by comparing said initial duty cycle to a threshold, selecting said initial duty cycle as a secondary duty cycle if said initial duty cycle exceeds said threshold, adding an offset to said initial duty cycle to obtain a secondary duty cycle if said initial duty cycle does not exceed said threshold; and controlling said motor using said secondary duty cycle.

3. The method of claim 2 further comprising:
    converting said initial duty cycle to a linearized duty cycle in response to a linearization table; and
    selecting said linearized duty cycle as said secondary duty cycle if said initial duty cycle is less than said threshold.

4. The method of claim 3 further comprising obtaining said linearization table by:
    positioning the motor in a set motor position;
    measuring motor current for a plurality of initial duty cycle counts;
    fitting a line to a linear portion of a plot of motor current versus initial duty cycle count.

5. The method of claim 4 wherein:

said offset corresponds to a duty cycle count where said line crosses zero current.

6. The method of claim 2 wherein:

said motor is a multi-phase motor;

said motor control signal includes a duty cycle for each phase; and said linearizing and said adding an offset is performed for each phase.

7. A torque linearization device for linearizing torque produced by a motor in response to a motor control signal having an initial duty cycle, the device comprising:

a comparator for receiving said initial duty cycle and comparing the initial duty cycle to a threshold;

a linearization table for converting said initial duty cycle to a linearized duty cycle;

a selector for receiving said initial duty cycle and said linearized duty cycle, said selector selecting one of said initial duty cycle and said linearized duty cycle as a secondary duty cycle in response to said comparing.

8. The torque linearization device of claim 7 further comprising:

a summer for adding an offset to said secondary duty cycle to obtain an adjusted duty cycle.

9. The torque linearization device of claim 7 wherein:

said selector selects said initial duty cycle as said secondary duty cycle if said initial duty cycle exceeds said threshold.

10. The torque linearization device of claim 7 wherein:

said selector selects said linearized duty cycle as said secondary duty cycle if said initial duty cycle is less than said threshold.

11. A storage medium encoded with machine-readable computer program code for controlling a motor in an electric power steering system, the storage medium including instructions for causing a controller to implement a method comprising:

obtaining a motor control signal having an initial duty cycle;

linearizing said initial duty cycle to obtain a secondary duty cycle;

adding an offset to said secondary duty cycle to obtain an adjusted duty cycle; and controlling said motor using said adjusted duty cycle.

12. A storage medium encoded with machine-readable computer program code for controlling a motor in an electric power steering system, the storage medium including instructions for causing a controller to implement a method comprising:

obtaining a motor control signal having an initial duty cycle;

linearizing said duty cycle by comparing said initial duty cycle to a threshold, selecting said initial duty cycle as a secondary duty cycle if said initial duty cycle exceeds said threshold, adding an offset to said initial duty cycle to obtain a secondary duty cycle if said initial duty cycle does not exceed said threshold; and controlling said motor using said secondary duty cycle.

13. The storage medium of claim 12 further comprising instructions for causing the controller to implement:

converting said initial duty cycle to a linearized duty cycle in response to a linearization table; and selecting said linearized duty cycle as said secondary duty cycle if said initial duty cycle is less than said threshold.

14. The storage medium of claim 12 wherein:

said motor is a multi-phase motor;

said motor control signal includes a duty cycle for each phase; and said linearizing and said adding an offset is performed for each phase.

* * * * *